(12) United States Patent
Leitz

(10) Patent No.: US 8,810,380 B2
(45) Date of Patent: Aug. 19, 2014

(54) GOLF SCORING MANAGEMENT SYSTEM

(76) Inventor: Gerald F. Leitz, New Milford, CT (US)

(\*) Notice: Subject to any disclaimer, the term of this patent is extended or adjusted under 35 U.S.C. 154(b) by 0 days.

(21) Appl. No.: 13/540,572

(22) Filed: Jul. 2, 2012

(65) Prior Publication Data

US 2013/0234842 A1 Sep. 12, 2013

Related U.S. Application Data

(60) Provisional application No. 61/503,774, filed on Jul. 1, 2011.

(51) Int. Cl.
*A63B 69/00* (2006.01)
*G07F 17/32* (2006.01)
*G06Q 10/10* (2012.01)
*A63B 71/06* (2006.01)
*H04M 1/725* (2006.01)

(52) U.S. Cl.
CPC ......... *A63B 71/0669* (2013.01); *A63B 2225/50* (2013.01); *G07F 17/3288* (2013.01); *A63B 2220/807* (2013.01); *H04M 1/72561* (2013.01); *G06Q 10/10* (2013.01); *A63B 71/0616* (2013.01); *A63B 2225/20* (2013.01); *A63B 2243/0029* (2013.01); *H04M 1/72544* (2013.01)
USPC .................. 340/323 R; 340/691.6; 340/10.42

(58) Field of Classification Search
USPC ....... 340/323 R, 323 B, 328, 313–314, 407.2, 340/815.79, 460, 691.6, 5.84, 10.42
See application file for complete search history.

(56) References Cited

U.S. PATENT DOCUMENTS

| | | | |
|---|---|---|---|
| 4,910,677 A * | 3/1990 | Remedio et al. ................ 700/92 |
| 6,224,486 B1 * | 5/2001 | Walker et al. ................... 463/42 |
| 6,277,031 B1 * | 8/2001 | Cheek et al. .................. 473/294 |
| 2002/0049508 A1 * | 4/2002 | Williams ........................ 700/92 |
| 2002/0059006 A1 * | 5/2002 | Costin et al. ................... 700/92 |
| 2003/0122367 A1 * | 7/2003 | Reis ............................... 283/50 |
| 2009/0239685 A1 * | 9/2009 | Belton et al. ................. 473/409 |

\* cited by examiner

*Primary Examiner* — Daniel Previl
(74) *Attorney, Agent, or Firm* — Ziegler IP Law Group LLC

(57) ABSTRACT

A system for automated scoring of a golf match for a group of players includes a controller with a memory in communication with a processor. The memory includes program instructions for execution by the processor to load player data including handicap information into a server, load course data into the server, identify team members, automatically assign team pairing based on handicap information of each team member and generate a scorecard for the golf match, the scorecard including the handicap information and team pairing information.

18 Claims, 18 Drawing Sheets

| autogolfscoring.com | 1 | 2 | 3 | 4 | 5 | 6 | 7 | 8 | 9 | 36 | S / T / A = TOT |
|---|---|---|---|---|---|---|---|---|---|---|---|
| Hole | | | | | | | | | | | |
| Par | 4 | 5 | 3 | 4 | 3 | 4 | 5 | 3 | 4 | | |
| John B.  4  [SW] | T_ | T_ | T_ST_ | T_ | T_ | T_ST | T_ST | T_ | T_ | - | 0.0 / 0.00 / 0.00 = 0.00 |
| Bob J.  15 [SW] | T_S_ | T_ | T_ | - | - | - | - | - | - | - | 0.0 / 0.00 / 0.00 = 0.00 |
| Mike D.  9 [SW] | T_S_ | T_S_ | T_ | T_ | - | T_ST_S_ | - | T_ | T_S | - | 0.0 / 0.00 / 0.00 = 0.00 |
| Dave M.  12 | T_ | T_ | T_ | T_ | T_ | T_ | T_ | T_ | T_ | - | 0.0 / 0.00 / 0.00 = 0.00 |
| John +/- | - | - | - | - | - | - | - | - | - | - | |
| Bob +/- | - | - | - | - | - | - | - | - | - | - | |
| JB / BJ +/- | - | - | - | - | - | - | - | - | - | - | |
| JB / BJ AGG. | - | - | - | - | - | - | - | - | - | - | |
| White | 343 | 425 | 150 | 370 | 170 | 343 | 425 | 150 | 370 | 2746 | |
| Red | 319 | 390 | 132 | 310 | 100 | 319 | 390 | 132 | 310 | 2402 | |

Figure 3

Figure 6 www.autogolfscoring.com

LEAGUE SETTINGS

1002

League Name [        ]

Admin email [        ]

Number of Events [        ]

Starting Date [        ]   Dates increment   ○ Weekly
                                              ○ Daily Number of Teams [        ]

Players per Team [        ]

Handicap given [        ]   % of score over par

Max Score per Hole   ○ Enter as played
                     ○ Double par
                     ○ 9 Max
                     ○ USGA Rules Playing Partners   ○ AB, CD, EF etc. (low hdcp partners always)
                   ○ AB, AC, AD rotates for all events

[ Previous ]          [ Next ]          [ Current ]

Figure 10 www.autogolfscoring.com

LEAGUE SETTINGS

1102

League Name: Jay's Automotive

Admin email: jaysauto@gmail.com

Number of Events: 15

Starting Date: 5/25/2012    Dates increment  ● Weekly
                                              ○ Daily Number of Teams: 6

Players per Team: 4

Handicap given: 80   % of score over par

Max Score per Hole:
● Enter as played
● Double par
● 9 Max
● USGA Rules

Playing Partners:
● AB, CD, EF etc. (low hdcp partners always)
● AB, AC, AD rotates for all events

[Previous]   [Next]   [Current]

Figure 11 www.autogolfscoring.com

LEAGUE SCHEDULE — 1204

League Name: Jay's Automotive
Number of Events: 15

5/25/2012
6/1/2012
6/8/2012
6/15/2012
6/22/2012
6/29/2012
7/6/2012
7/13/2012
7/20/2012
7/27/2012
8/3/2012
8/10/2012
8/17/2012
8/24/2012
9/7/2012

Add another Golf Course

Richter Park - Front White
Candlewood - Front White
Pomperaug - Front White
Sunset Hill - Front White
INACTIVE WEEK

— 1206

1202

[Previous] [Next] [Current]

Figure 12 www.autogolfscoring.com

LEAGUE SCHEDULE

League Name: Jay's Automotive
Number of Events: 15

| Date | Course | Match |
|---|---|---|
| 5/25/2012 | Richter Park - Front White | AB - CD |
| 6/1/2012 | Candlewood - Front White | AC - BD |
| 6/8/2012 | Pomperaug - Front White | AD - BC |
| 6/15/2012 | Sunset Hill - Front White | AB - CD |
| 6/22/2012 | Richter Park - Front White | AC - BD |
| 6/29/2012 | Candlewood - Front White | AD - BC |
| 7/6/2012 | INACTIVE WEEK | |
| 7/13/2012 | | |
| 7/20/2012 | | |
| 7/27/2012 | | |
| 8/3/2012 | | |
| 8/10/2012 | | |
| 8/17/2012 | | |
| 8/24/2012 | | |
| 9/7/2012 | | |
| 9/14/2012 | | |

Add another Golf Course:
Richter Park - Front White
Candlewood - Front White
Pomperaug - Front White
Sunset Hill - Front White
INACTIVE WEEK

1302

[Previous] [Next] [Current]

Figure 13 www.autogolfscoring.com

LEAGUE SCHEDULE

League Name: Jay's Automotive
Number of Events: 15

| Date | Course | Matchup |
|---|---|---|
| 5/25/2012 | Richter Park - Front White | AB - CD |
| 6/1/2012 | Candlewood - Front White | AC - BD |
| 6/8/2012 | Pomperaug - Front White | AD - BC |
| 6/15/2012 | Sunset Hill - Front White | AB - CD |
| 6/22/2012 | Richter Park - Front White | AC - BD |
| 6/29/2012 | Candlewood - Front White | AD - BC |
| 7/6/2012 | INACTIVE WEEK | |
| 7/13/2012 | Pomperaug - Front White | AB - CD |
| 7/20/2012 | Sunset Hill - Front White | AC - BD |
| 7/27/2012 | Richter Park - Front White | AD - BC |
| 8/3/2012 | Candlewood - Front White | AB - CD |
| 8/10/2012 | Sunset Hill - Front White | AC - BD |
| 8/17/2012 | Richter Park - Front White | AD - BC |
| 8/24/2012 | Candlewood - Front White | AB - CD |
| 9/7/2012 | Sunset Hill - Front White | AC - BD |
| 9/14/2012 | Candlewood - Front White | AD - BC |

Add another Golf Course

Richter Park - Front White
Candlewood - Front White
Pomperaug - Front White
Sunset Hill - Front White
INACTIVE WEEK

1402

[Previous] [Next] [Current]

Figure 14 www.autogolfscoring.com

1502 LEAGUE SCHEDULE 1504 1506

League Name: Jay's Automotive

| Date | Course | T1 | T2 | T3 | T4 | T5 | T6 |
|---|---|---|---|---|---|---|---|
| 5/25/2012 | Richter Park - Front White AB - CD | 6 | 5 | 4 | 3 | 2 | 1 |
| 6/1/2012 | Candlewood - Front White AC - BD | 5 | 4 | 6 | 2 | 1 | 3 |
| 6/8/2012 | Pomperaug - Front White AD - BC | 4 | 3 | 2 | 1 | 6 | 5 |
| 6/15/2012 | Sunset Hill - Front White AB - CD | 3 | 6 | 1 | 5 | 4 | 2 |
| 6/22/2012 | Richter Park - Front White AC - BD | 2 | 1 | 5 | 6 | 3 | 4 |
| 6/29/2012 | Candlewood - Front White AD - BC | 6 | 5 | 4 | 3 | 2 | 1 |
| 7/6/2012 | INACTIVE WEEK | | | | | | |
| 7/13/2012 | Pomperaug - Front White AB - CD | 5 | 4 | 6 | 2 | 1 | 3 |
| 7/20/2012 | Sunset Hill - Front White AC - BD | 4 | 3 | 2 | 1 | 6 | 5 |
| 7/27/2012 | Richter Park - Front White AD - BC | 3 | 6 | 1 | 5 | 4 | 2 |
| 8/3/2012 | Candlewood - Front White AB - CD | 2 | 1 | 5 | 6 | 3 | 4 |
| 8/10/2012 | Sunset Hill - Front White AC - BD | 6 | 5 | 4 | 3 | 2 | 1 |
| 8/17/2012 | Richter Park - Front White AD - BC | 5 | 4 | 6 | 2 | 1 | 3 |
| 8/24/2012 | Candlewood - Front White AB - CD | 4 | 3 | 2 | 1 | 6 | 5 |
| 9/7/2012 | Sunset Hill - Front White AC - BD | 3 | 6 | 1 | 5 | 4 | 2 |
| 9/14/2012 | Candlewood - Front White AD - BC | 2 | 1 | 5 | 6 | 3 | 4 |

Previous   Next   Current

Figure 15

1602 www.autogolfscoring.com

LEAGUE GOLFERS

League Name: Jay's Automotive    [Read CSV File]

| First Name | Last Name | Email | Phone | Hdcp | Team |
|---|---|---|---|---|---|
| John | Smith | jsmith@gmail.com | 203-555-2323 | 10 | Sub |
| Bill | White | bwhite@gmail.com | 215-555-3456 | 8 | 2 |
| Dave | Black | daveblack@gmail.com | 317-555-2345 | 3 | 2 |
| Jim | Hirsch | jimhirsch@gmail.com | 617-555-1234 | 4 | Sub |
| John | Flynn | jflynn@gmail.com | 609-555-8976 | 7 | 2 |
| Ron | Beers | rbeers@gmail.com | 315-555-3636 | 12 | 5 |
| Greg | Smith | gregsmith@gmail.com | 813-555-1357 | 8 | 2 |
| Paul | Vick | paulv123@gmail.com | 610-555-3789 | 5 | 2 |
| Doug | Hagan | dhagan@gmail.com | 415-555-1563 | 2 | 1 |
| Wayne | Williams | wwilliams@gmail.com | 213-555-9898 | 3 | 5 |
| Joyce | Keith | jkeith@gmail.com | 718-555-5656 | 2 | 2 |

[Previous]   [Next]   [Current]

Figure 16 www.autogolfscoring.com

LEAGUE PLAYER RESULTS  1702

League Name [Jay's Automotive]

| Player | Hdcp | Team | Points Total |
|---|---|---|---|
| John Smith | 10 | Sub | 21.33 |
| Bill White | 8 | 2 | 20.13 |
| Dave Black | 3 | 2 | 19.98 |
| Jim Hirsch | 4 | Sub | 15.25 |
| John Flynn | 7 | 2 | 14.56 |
| Ron Beers | 12 | 5 | 12.67 |
| Greg Smith | 8 | 2 | 10.98 |
| Paul Vick | 5 | 2 | 10.50 |
| Doug Hagan | 2 | 1 | 9.00 |
| Wayne Williams | 3 | 5 | 8.67 |
| Joyce Keith | 2 | 2 | 5.25 |

[Previous] [Next] [Current]

Figure 17 www.autogolfscoring.com

LEAGUE TEAM RESULTS

League Name: Jay's Automotive

| Players | Team | Points Total |
|---|---|---|
| John T., Bill W., Rob V., Rick W. | 5 | 81.67 |
| Tom T., Rick W., Dennis P., Gabe C. | 3 | 79.37 |
| Xavier P., Bob M., Rich S., Andy N. | 4 | 75.00 |
| Bill R., Dave W., Tom Z., Tony Y. | 1 | 72.56 |
| Dave B., Ron B., Paul V., Wayne W. | 6 | 31.20 |
| Joyce K., Jim H., Greg S., Jerry L. | 2 | 30.33 |

— 1804

1802

[Previous] [Next] [Current]

Figure 18

GOLF SCORING MANAGEMENT SYSTEM

CROSS-REFERENCE TO RELATED APPLICATIONS

This application claims priority to and the benefit of U.S. Provisional Patent Application Ser. No. 61/503,774, filed on Jul. 1, 2011, the disclosure of which is incorporated herein by reference in its entirety.

BACKGROUND

1. Field

The present disclosure relates to golf scoring systems, and particularly to a scoring system for golf tournaments.

2. Description of Related Art

In competitions, such as golf, where there are many teams and/or many players, all of the scores of the individual players need to be recorded and compared to determine the winner and the order of finish. In addition, many golf competitions use the notion of handicapping so that teams/players of unequal ability can fairly compete against one another. In order to do that, scorecards must be prepared in advance by an administrator who has knowledge of the handicaps of all of the teams and players and can take into account their differences in ability. Some competitions have hundreds of competitors and it is not only extremely time consuming to prepare the scorecards, but it is error prone as well. To compound the problems, competitions often have a number of rounds of play and this will be an ongoing task for the administrator, as each round of play will need new fully prepared scorecards.

In addition to preparing the scorecards in advance of each of the many rounds of competition, the administrator must take the finished scorecards from each round and calculate the results. This process of calculating scores and match outcomes to update the results is as well very time consuming and again is very error prone.

An example to show the amount of work required would be a golf tournament referred to as a Member-Member or a Member-Guest tournament, for example. In this format, one team is typically made up of 2 players, and 6 teams will make up a group known as a flight. Each team will play each of the other 5 teams in their flight once. One team against another is considered one match, and it consists of 9 holes of match play. In match play, for each hole, the best net score of two teammates is compared against the best net score of the two opponents. The lowest score wins the hole. The winning team is the team that wins the most holes. Points are assigned after each match, and the winner of the flight will be the team with the most points after playing all 5 matches. It is common to have 14 flights and so there can easily be 168 players in the tournament. There will also be a main prize as to which of the 14 flight winners had the most points.

In order to play in this format, the administrator will have to prepare a large number of scorecards. To prepare just one scorecard, the administrator will typically carry out a number of manual steps. Referring to FIG. 1, an exemplary scorecard 100 of the prior art is illustrated. In this example, a flight number 102, which in this example is "FLIGHT 10" is recorded on the scorecard 100. The team numbers 104 for the flight are recorded, which in this example are shown as "TEAM 4" and "TEAM 6." The names of the players 106 are recorded on the scorecard 100. The handicap values 108 are recorded next to the respective name of each player 106.

The lowest handicap of the players is recorded, which in this example corresponds to the value "4" adjacent to the player "John B." The lowest handicap "4" is subtracted from the next lowest player, which in this example the indicated handicap of "9" adjacent "Mike D." The result of the subtraction represents the number of 'strokes' that the second lowest handicap player "Mike D." will receive from the best player "John D." In this example, "Mike D" receives "5" strokes, and a check mark is placed in each box representing the number of strokes being received by that player on that hole. This exercise is carried out for each of the players 106. In this example, "Dave M" receives 8 strokes and "Bob J" receives 11 strokes.

A skilled administrator can typically prepare one scorecard in about 1.5 minutes. To complete the first round for all teams, this process will be need to be performed 3 times per flight and since there are 14 flights, 42 scorecards need to be prepared. This will then be repeated 4 more times for the remaining rounds, and therefore a total of 210 scorecards need to be prepared for the tournament. This requires about 315 minutes, or over 5 hours. While attempts have been made to automate this process, the attempts are typically limited to the printing of the scorecard itself. Additionally, these systems are generally not able to address issues related to four-point league play that require two handicaps per player to be complete.

When a match is completed, the scorecard is handed to the administrator. The administrator must now verify that the team claiming to win actually did defeat their opponent, and that the margin of victory is correct. This is important because more points are awarded for a large margin of victory while fewer points are awarded for winning by only one stroke. At this time the points now need to be recorded. This post match process is also very time consuming and is error prone. Not only that, but in a typical tournament based on the example above, this scoring recording process could be repeated 210 times over a 2 day period.

In addition to this form of competition, there is another golf competition, commonly referred to as "Skins" In the Skins game, every scorecard 100 is examined for "birdies" or "eagles", as those terms are generally understood by one of skill in the art with respect to the game of golf. With many competitors and many scorecards, there will be many holes under par. If there are one or two birdies on a hole, then that hole is a Skin, and money will be earned. As soon as there are three or more birdies on a hole, it is not a Skin. This can be a difficult part of the administrator's job. Each scorecard has to be searched for birdies. The Skins "pot" needs to be divided up based on the results of the scoring, and with a large number of players, this can again be very difficult and error prone. These types of competitions, bets or wagers will generally be referred to herein as "parts" of a golf match or "competition parts" of a golf match.

The previous example showed how much work is required to manage the scoring for a 2-day tournament. In some events, this process can be spread out over a number of weeks. A common example of this would be a golf league where teams compete against each other by playing once per week for a golf season. As an example, it would be common for 10 teams to compete by playing the other 9 teams twice each for a total of 18 weeks. Each team consists of 6 players where each player is ranked A to F with A being the best player on that team. In a given week, players A and B of one team will play the opposing team's A and B players. These 4 players will make up one foursome, with 2 players from each team and will need scorecards for that match. Players C and D of each team will be another foursome, as will players E and F of each team.

In these types of events, there can be a total of 4 parts to one match. Each part is worth one point, and this is how they are assigned, assuming that Team 1 is playing Team 2 on a specific week:

Part 1: One point is assigned for the match play winner of Team 1 Player A and Player B against Team 2 Player A and Player B. A tie gives ½ point for each team.

Part 2: One point is assigned for the match play winner of Team 1 Player A against Team 2 Player A. A tie gives ½ point for each player.

Part 3: One point is assigned for the match play winner of Team 1 Player B against Team 2 Player B. A tie gives ½ point for each player.

Part 4: One point is assigned for the aggregate play winner of Team 1 Player A and Player B against Team 2 Player A and Player B. Aggregate play means counting the total strokes for both players of a team and subtracting their handicaps. The aggregate score of Team 1 is compared against the aggregate score of Team 2, and a tie gives ½ point for each team.

In the points description above, it referred to Players A and B. However, the same point description also applies to Players C and D, as well as to Players E and F in their respective matches. Therefore, there are 4 possible points in the A and B match, 4 possible points in the C and D match, and 4 possible points in the E and F match. This allows a total of 12 possible points for the entire team.

In order to play in this format, a special scorecard needs to be created. On this scorecard, all 14 steps outlined in the previous example must be performed, and this is only to create the two-on-two match play format as described in Part 1 above. For Part 2, the handicap calculations and stroke adjustments described above need to be performed relative to the two A Players of both teams. This results in more check marks on the scorecard. For Part 3, the handicap calculations and stroke adjustments are performed relative to the two B Players of both teams. It should be noted that it is considered difficult to do on one scorecard, and that a choice is usually made to put the marks for Parts 2 and 3 and not add the marks for Part 1 at all. Part 4 does not require extra effort before the match.

A skilled administrator could prepare one scorecard is about 2 minutes, and this would require 3 scorecards to handle the match between Team 1 and Team 2. Ten teams results in 5 matches per week with 3 scorecards per match. Therefore 15 scorecards are needed per week and this requires about 30 minutes for the administrator. For an 18 week season, this would take 540 minutes, or 9 hours, of the administrator's time. This is not only a large amount of time, but it is error prone as well. To compound the problem, there are many weeks where a player informs the administrator only hours before the match that he cannot make it that day. In this case, a substitute player is found. However, when this occurs, the original scorecard that was prepared is useless and a new one must be made using the handicap of the substitute. This is very difficult for the administrator who may have tried to fill out the scorecards days ahead.

When a foursome finishes, the scorecard is handed to the administrator. During the match, the players would have tried to determine the status as they played each hole. The two Parts for one-on-one match play are usually correct, but the two-on-two match play Part and the total score Part are usually not calculated correctly. Therefore, most players do not know the status of all of the four Parts when they finish playing, and they do not get the results right away. The administrator is now responsible to go through the scorecards and calculate the results, and this process will not be undertaken at the time of the event. Players will usually receive the completed results days later when the administrator finishes looking at all of the scorecards.

After calculating the results of each weekly match by working on 15 scorecards, the administrator must now tally up all of the points for the season and record the results. In addition, each of the 60 player's handicaps must be recalculated based on how they just played. This post-match process is again very time consuming and is error prone. Not only that, but it needs to be completed for each of 18 weeks. This means that the administrator will work on 270 scorecards and will calculate and then enter 1080 scores for the players in this league.

In certain electronic scoring systems, the process for entering scores can be cumbersome and will typically involve a number of steps and entries. When on the golf course, these processes can be cumbersome. It would be advantageous to be able to enter scores directly into for example a smartphone, with a minimal number of steps and user inputs.

In other electronic scoring systems, the result data is not immediately displayed. Typically, one has to navigate through one or more screens to get to a result screen. It would be advantageous to be able to have the individual, team and match results readily displayed with a minimum of navigation.

Accordingly, it would be desirable to provide a substantially automated golf score recording and scoring system that addresses at least some of the problems identified above.

SUMMARY OF THE INVENTION

As described herein, the exemplary embodiments overcome one or more of the above or other disadvantages known in the art.

One aspect of the exemplary embodiments relates to a system for golf scoring system. In one embodiment, the system includes a controller with a memory in communication with a processor. The memory includes program instructions for execution by the processor to load player data including handicap information into a server, load course data into the server, identify team members, automatically assign team pairing based on handicap information of each team member and generate a scorecard for the golf match, the scorecard including the handicap information and team pairing information.

In another aspect, the disclosed embodiments are directed to a computer program product. In one embodiment, the computer program product includes computer readable code means, the computer readable program code means when executed in a processor device, being configured to detect an identifier of a player for a golf match, retrieve golf handicap information for the player, store the player identification and golf handicap information, assign players to a team, each player having an identifier and golf handicap, create player pairings for each team based on a handicap of each player and generate a scorecard for the golf match, the scorecard identifying the player, teams and golf handicap information.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and unless otherwise indicated, they are merely intended to conceptually illustrate the structures and procedures described herein. In addition, any suitable size, shape or type of elements or materials could be used.

BRIEF DESCRIPTION OF THE DRAWINGS

In the drawings:

FIG. 3 is an illustration of an exemplary electronic scorecard incorporating aspects of the disclosed embodiments.

FIG. 6 is an illustration of an exemplary scorecard that is imaged by a scorecard imaging process incorporating aspects of the disclosed embodiments.

FIGS. 10-18 are screen shots of exemplary web pages illustrating aspects of the disclosed embodiments.

DETAILED DESCRIPTION OF THE DISCLOSED EMBODIMENTS

Figure 1:
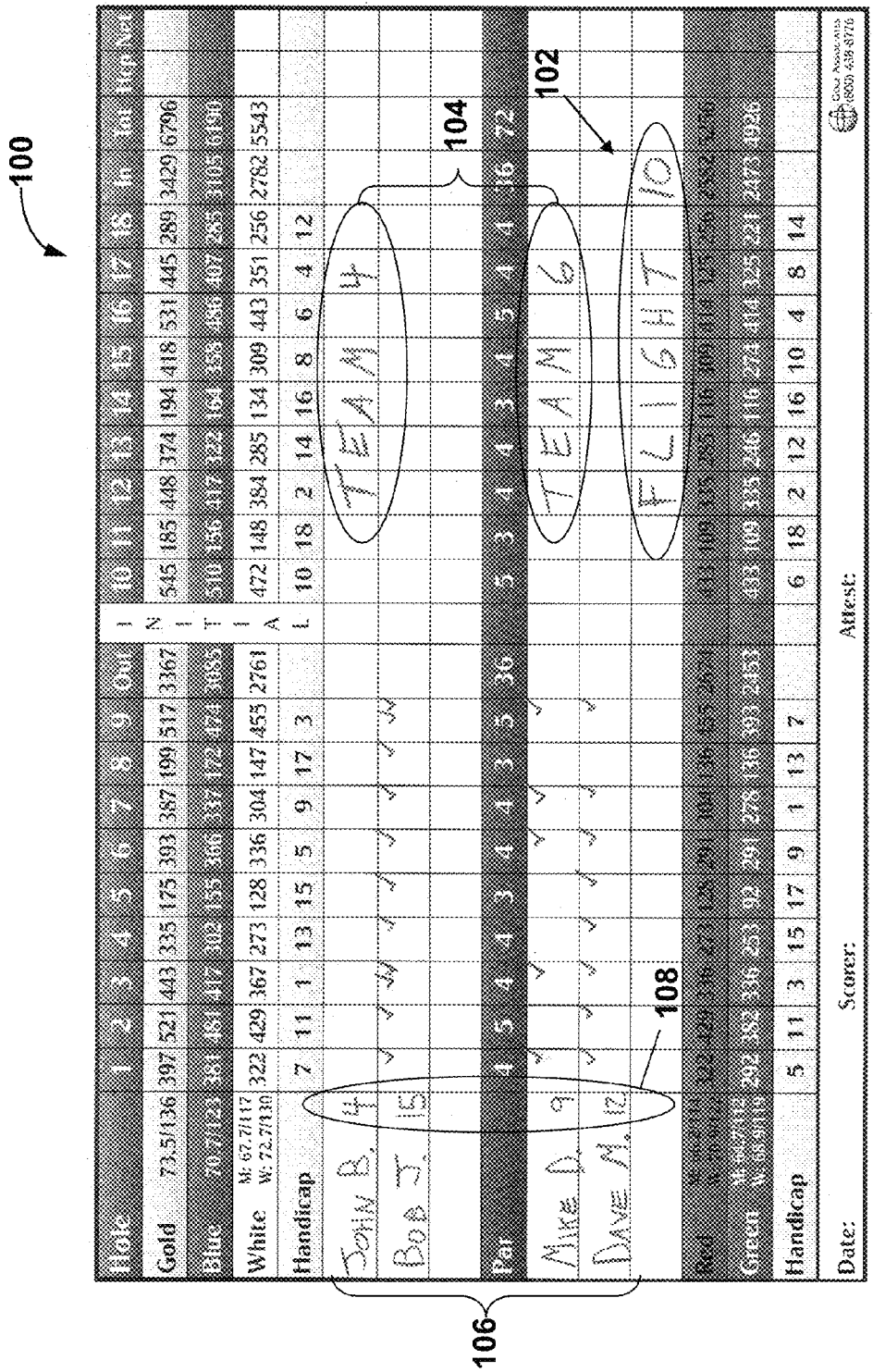
FIG. 1 is an illustration of a typical prior art score card.
Figure 2:
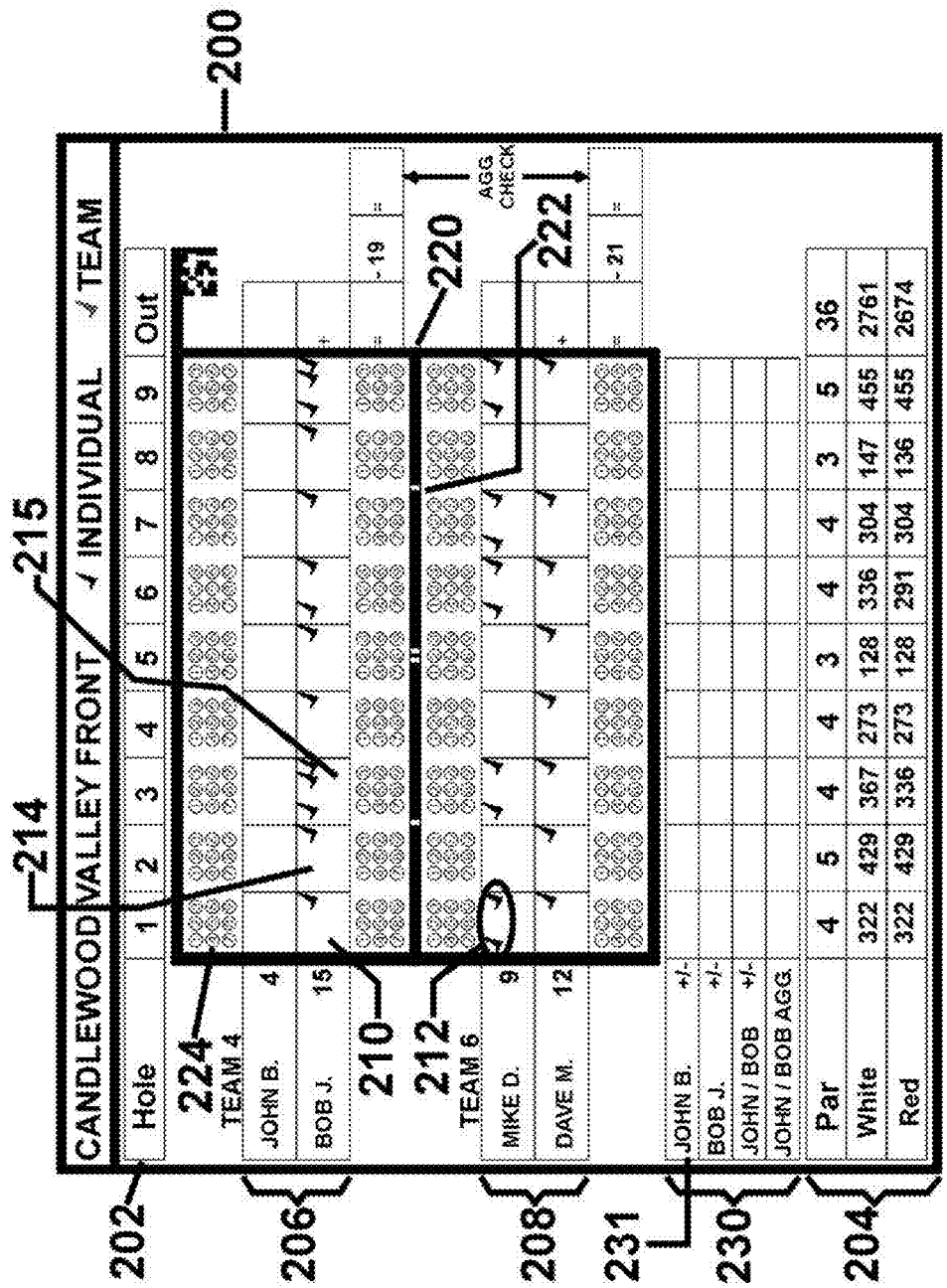
FIG. 2 is an illustration of an exemplary scorecard incorporating aspects of the disclosed embodiments.

Referring to FIG. 2, an exemplary golf scoring card for a system incorporating aspects of the disclosed embodiments is shown. The aspects of the disclosed embodiments are generally directed to a golf scoring system that includes a custom formatted physical and electronic golf scorecard that automatically includes all of the information needed for a golf match or competition and a system for processing the information.

As is illustrated in FIG. 2, in one embodiment, the scorecard 200 includes course information, such as hole numbers in an area generally indicated as block 202, pars and yardages in the area indicated as block 204, player's names in blocks 206 and 208, and the handicap of each player adjacent to the name. The particular layout of course information in FIG. 2 is merely exemplary, and in alternate embodiments, the course information can be presented in any suitable area of the scorecard 200.

As shown in FIG. 2, the scorecard 200 includes blocks 210 into which the particular score on the respective hole is entered. Also shown in this example are marks 212 in one or more of the boxes 210, shown here as checkmarks. The checkmarks 212 are entered in each block 210 to indicate the number of strokes that the player receives on the respective hole, relative to a handicapping system. In block 214, the single checkmark 212 refers to a single stroke, while in block 215, there are two marks 212 indicating two strokes. The particular type of mark used to represent a stroke and the particular placement with the block 210, can vary as desired. For example, in some cases "dots" or periods can be used in place of checkmarks. Colors can also be used to distinguish the number of strokes being given. In one embodiment, the position of the mark 212 within the block 210 can also be used to identify the type of strokes being given. For example, a mark 212 on the left hand side of the block 210 can indicate a team stroke, while a mark 212 on the right hand side of the block 210 can indicate an individual player stroke. The aspects of the disclosed embodiments are not intended to be limited by the particular choice, style or location of mark 212. As another example, in the embodiment shown in FIG. 3, a "T" is used to show a team stroke, while an "S" is shown for an individual player stroke.

While the example of FIG. 2 generally refers to a paper style scorecard 200, in one embodiment, the scorecard 200 can be configured as an electronic scorecard that is presented on the user interface or display of a computing device, such as a computer, mobile communication device, smartphone, table or pad. FIG. 3 illustrates one embodiment of an electronic scorecard 300 incorporating aspects of the present disclosure as it might appear on a display of a computing or communication device. In this example, the scorecard 300 includes an area 304 for course information. Player names can appear in blocks 306. Area 308 can be used for the two individual matches ("John" versus "Bob") and the team match ("JB/BJ"). Area 314 is used to illustrate the row on the scorecard 300 where aggregate data for the match is found. The rows of blocks 310 are used to record the score for each hole and category.

The stroke indicators 311 and 312, indicated by the letters "S" and "T", respectively in the blocks 310 for each hole, illustrate the type of stroke being applied, "S" for an individual stroke and "T" for a team stroke, and the number of strokes. In one embodiment, either one or both of the color and position of the marks 311, 312 in the block 310 can also identify the type of stroke. In the exemplary screen 300 of FIG. 3, the strokes "T" for team play are on the left side of a block or square 310, while the strokes "S" for individual play are on the right side of the block 310. Where more than one stroke is being given, there will be a corresponding number of "T" or "S" characters arranged in the block 310. In alternate embodiments, any suitable letters or other indicators can be used to represent team and individual strokes.

The aspects of the disclosed embodiments allow an administrator, player or authorized person to setup a golf league including downloading or inputting player information and selecting a golf course where the tournament or match will be played. Player data, such as handicap information, is typically maintained by a central registry, which can be a system maintained by an individual golf club, the Golf Handicap and Information Network ("GHIN"), or a suitable on-line golf handicap system. As will be generally understood, in most cases, golf course information, such as par and slope ratings, is available online and can be downloaded. Thus, the player identification information can be used to obtain the player's golf handicap and the course identified and the relevant course information downloaded. Alternatively, the player and handicap information can be manually inputted into the system, where it can be electronically stored.

In one embodiment, once the administrator identifies the members or players of each of the respective teams for the tournament, the system of the disclosed embodiments will automatically prepare and generate the golf scorecards, either in a printable form 200, such as shown in FIG. 2 or an electronic form 300 as is shown in FIG. 3. The exemplary scorecard 300, which can be presented on the display of a mobile communication device, such as a smart phone or tablet type device, is generally configured to present in appearance in substantially the same form as a typical golf scorecard. Players will generally be very used to the format that is typically presented on the average scorecard. The aspects of the disclosed embodiments advantageously allow the player to readily recognize and be familiar with the format of the scorecard 300. The course information, player information, including handicap and strokes, is shown on the scorecard. The marks for both single and team match play are displayed, and can be both color and position coded. Information related to each part of the match is displayed, generally on the same page as the data entry, and can include information indicating the present status of each of the parts of the match.

The system of the disclosed embodiment can also be configured to automatically arrange, display as well as rearrange, the list of players on the scorecard 200 and 300 in any suitable manner, such as from low handicap to highest handicap. In one embodiment, the arrangement and pairings of individuals and teams can be switched automatically or as selected by the user.

As is shown in FIG. 2, Team 4 is shown in area 206 while Team 6 is shown in area 208. The aspects of the disclosed embodiments allow the positioning of the teams on the scorecards 200, 300 to be automatically moved and switched, such as by activating a "team switch" selection feature on the user interface being used to set up the scorecard 200, 300. This allows the scorecards 200, 300 to be reviewed and adjusted as needed at any point during the setup or match.

In one embodiment, the placement and pairing of individual players can be switched. For example, where the handicaps of two players on a team are the same, it may be desirable to switch the players so one can play a better player on the other team. In this case, activating a "individual player switch" button on the user interface can automatically switch and rearrange the order and pairing of the players on the scorecards 200, 300. Where the handicaps are not the same, or some other pre-determined criteria is not met, the system can be configured to disable the switch. In such as case, the switch selection feature can be grayed out or disabled. Thus, only the player information needs to be provided to the system, and the system will automatically arrange and order the players in an indicated or pre-determined manner.

The aspects of the disclosed embodiments also enable the substituting of players and reflecting the change on the scorecard 200, 300. It invariably happens that a team member cannot play and one or more other players have to be substituted. A manually prepared paper scorecard will require manual correction. The aspects of the disclosed embodiments allows the administrator, for example, to simply pull the team scorecard up on the system, and select and input the new players. Even if web access is unavailable to obtain the new player information, the scorekeeper can enter the information manually. The new information, including handicaps, strokes, player ordering and team pairings, is automatically calculated and presented on the scorecard 200, 300. In the case of a printable scorecard 200, the new, up to date card can be printed. The electronic scorecard 300 will be automatically be updated and can also allow for the switching and substituting of players and teams on the fly.

The aspects of the disclosed embodiments also allow for a scorecard to be prepared without player handicap information. For example, in the case of a substitute player for whom no handicap information is available, it is possible allow the player to compete and the system will calculate an "apparent handicap" after the match is complete. In the case of the typical scorecard and scoring system, the administrator must go back with the new, calculated handicap information and manually figure out all of the status information based on this calculated handicap. By this time, the match is long over and nobody knows who won. When using the printed scorecard 200, the system can determine the apparent handicap when the scorecard 200 is being scanned, as is described herein, and then apply the apparent handicap to the scoring results. When using an electronic scorecard 300, the aspects of the disclosed embodiments address this problem by constantly recalculating the new substitute's apparent handicap and applying it to the status and results after each hole. For instance, if a person shoots one over par after one hole, the aspects of the disclosed embodiments can make an assumption that the player will shoot nine over par after nine holes. A handicap of nine is then assigned to the new substitute and the match status is calculated. If the player shoot par on the next hole, then one over par after two holes is an average of four and a half over after nine holes. That is rounded to five and this is their handicap and the match is calculated. This will continue until all of the holes are complete, but all players will know where they stand in the match at all times.

Figure 4:
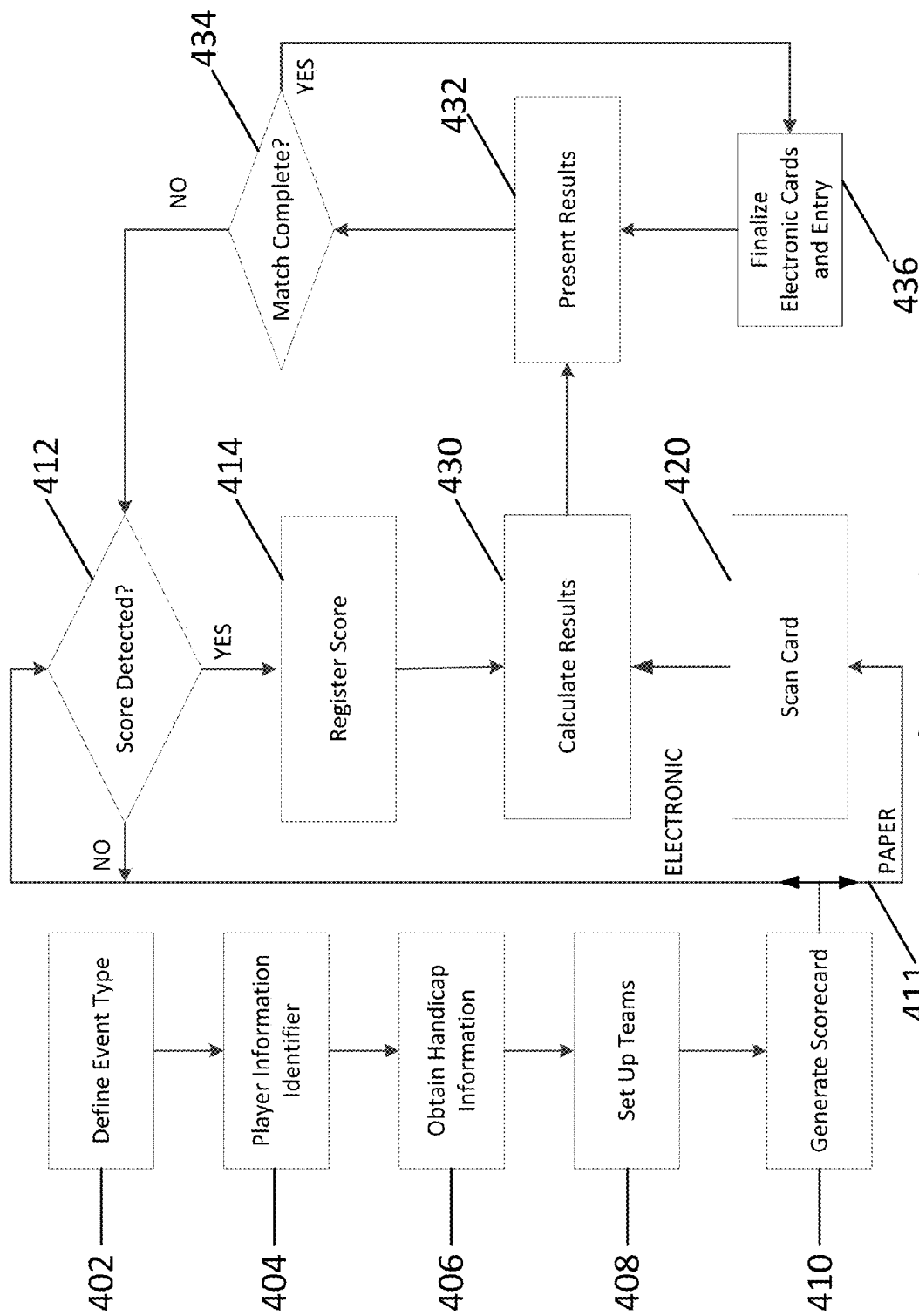
FIG. 4 is a flowchart illustrating an exemplary process incorporating aspects of the disclosed embodiments.

FIG. 4 illustrates one embodiment of setting up and scoring a golf league or tournament in a process incorporating aspects of the present disclosure. The golf league or tournament, as these terms are generally used herein refer to one or more golf matches. The process generally begins by the tournament director, or such other administrator defining 402 the type of event, number of events, number of teams and the number of players per team. The player information is inputted 404 into the system. In one embodiment, this includes downloading player data from a suitable data source, such as a website. Alternatively, the player information can be manually entered. The handicap for each player is identified 406. This can include manually inputting the player handicap or linking to a suitable player handicap data source and downloading the player handicap information.

Once the player information and handicap information is determined, the members of each team are identified 408. This team information will generally be provided by the tournament director. In one embodiment, the team information can be read from a player/team information card that is provided by a team captain. For example, the team captain or other person could complete a card that identifies each member of the team, using identifying information such as a player name or other identifier number. The system can then automatically assign the members to a team. Alternatively, the team information, including the player information, can be provided electronically by the team captain. For example, the team captain could access a website to sign a "team" up for the event, and provide the required player information. Once the team members are identified, the aspects of the disclosed embodiments are configured to automatically generate the team pairings. Typically, team pairings can be based on handicap, where players, or pairs of players, of similar handicap are slated to play against each other. In a multi-match or event format, the player pairings can be switched with each match. Thus, for each match, the player pairings can be switched. In one embodiment, the player pairings can also be manually changed.

Once the player pairings are identified, the scorecard can be prepared 410. In the case of the printed scorecard 200, the card can be printed. In the case of the electronic scorecard 300, the card 300 can be made available on the system. Changes to the teams, pairings and players can be updated in the system and automatically propagated to the scorecard.

Once the matches begin, the scorecard is updated 412. In the case of the printed card 200, the scores are manually entered on each hole and the completed card is scanned 420 at the end of the round. The results are then tabulated 430.

In the case of the electronic score card 300, the scores are inputted 414 into the scorecard at each hole. As the scores are inputted, the match results are tabulated 430. The tabulated match results are then made available 432. In one embodiment, the updated match results are presented 434 on the electronic scorecard 300. Thus, a player or team can monitor their activity and scoring, as well as the activity and scoring of their team members and other players in the league or tournament in real time.

Figure 5:
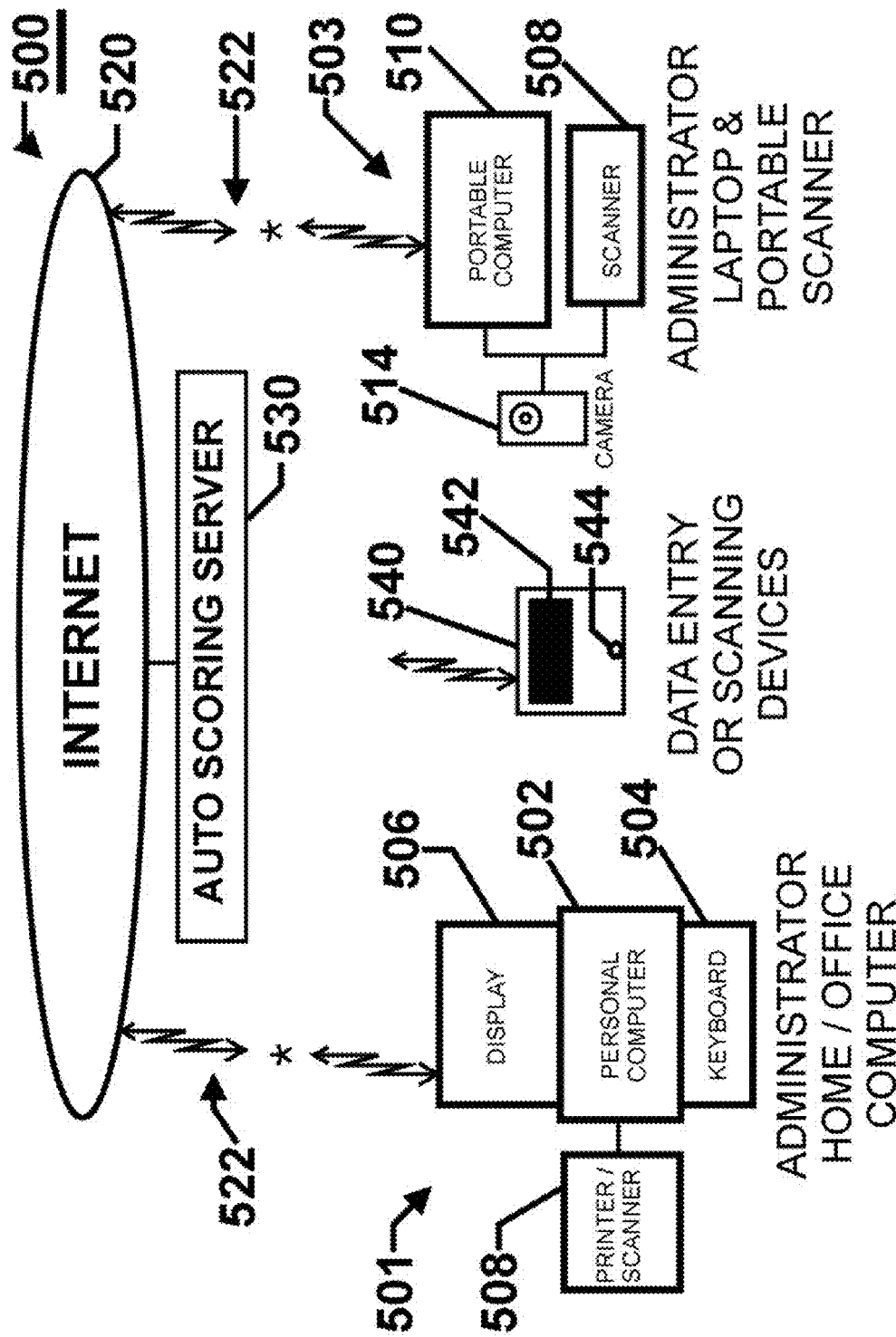
FIG. 5 is a block diagram of an exemplary system in which aspects of the disclosed embodiments can be practiced.

Referring to FIG. 5, one embodiment of an exemplary system 500 in which aspects of the present disclosure can be practiced is illustrated. In this example, the user or administrator system can comprise one or both of a home or office based system 501, also referred to as a desktop system, or a portable system 503. As shown in FIG. 5, the desktop system 501 generally comprises one or more of a computer 502, a printer and scanner device 508. The portable system 503 can include a portable computing device 510, such as for example, a laptop, smartphone, pad or tablet device, that is communicatively coupled to a portable printer and scanner device 512, for example. In one embodiment, the administrator system can include aspects of both the desktop 501 and portable system 503. Both the computer 502 and laptop 510 can be configured to be communicatively coupled to an auto scoring system or server 530. In one embodiment, the communication connection to the auto scoring server 530 is via the Internet 520. The communication gate or pathway 522 can be any suitable communication protocol, including, but not limited to, cellular, wireless, WiFi, WLAN communication protocols.

The auto scoring server 530 generally comprises a website or other suitable computer based system that includes or is coupled to one or more processors configured to execute machine-readable instructions. The auto scoring server 530 will also comprise memory and data storage devices. In one embodiment, the memory can include one or more databases that are configured to maintain information related to each player, handicap information, team information and scores.

In one embodiment, the administrator is able to access the auto scoring server 530 by logging into the server 530, using for example, a user name and password, in a manner that will be generally understood. Other users, such as players, can also be provided access to the server 530, to for example, input player and team information for setting up the matches and league, as well as observe and monitor results of the league and match play in real time.

In one embodiment, players are able to access and communicate with the auto scoring server 530 using a portable computing and communication device 540. Examples of a portable communication device 540 can include, but are not limited to, mobile communication devices, smartphones, pads or tablet type devices, or any other suitable portable or mobile communication device. In one embodiment, the portable communication device 540 is capable of being communicatively coupled to a wireless network, such as the Internet 520, to access the auto scoring server 530. In one embodiment, the player(s) will also be able to use the portable communication device 540 to log into the auto scoring server or website 530 using a user identifier and password, as is generally understood.

The aspects of the disclosed embodiments will allow the administrator to set up the event, such as a tournament, in advance by accessing the auto scoring server 530, using for example, the computer 502. Also, while physically at the event, the administrator can use the laptop system 510 to add players and make other changes, as well as print scorecards, process scores and print and display results. The scanners 508, 512 can be used to print scorecards as well as scan the printed scorecards 200 after the scores are entered onto the cards. Alternatively, scores are downloaded from the electronic scorecard 300 as is described herein and processed in the server 530.

In one embodiment, the score data from each scorecard 200, 300 is read and can be stored locally in a memory of the respective computer 502, 510, as well as automatically uploaded to and stored in the auto scoring server 530. For example, if Internet access is available when the completed scorecards 200, 300 are being processed, the data read from each card can be automatically uploaded to the auto scoring server 530 for processing. Alternatively, if Internet access is not available at the time the completed scorecards 200, 300 are being processed, the data read or otherwise obtained from the cards can be processed and stored locally, and then uploaded once an Internet connection is established with the auto scoring server 530. In one embodiment, the data read from the cards 200, 300 can also be processed, transmitted or downloaded to any other computer system, via a suitable communication connection and network, for storage and processing, such as for example, the local computer system of the golf course or tournament.

In one embodiment, when the scorecard is a printed scorecard 200, a camera device 514 can be used to extract the data from the scorecard. A picture of the completed scorecard 200 can be taken or imaged and the score data extracted from the image. In one embodiment, the score data is extracted by processing the image of the scorecard 200 and identifying the markings on the card. This can include identifying markings 212, 312 and their corresponding location on the scorecard, and correlating the marking and location information with score data that is stored in a memory or look-up table of the system 500, for example. Since the resolution of the camera device 514 will typically be less than that of the scanner 508, the aspects of the disclosed embodiments are configured to process images to subpixel resolution.

In one embodiment, edge detection can be used to find the most rapidly changing data. However, the data must be rapidly changing in a specific direction. One method of edge detection involves looking at the pixels around a specific pixel to see if it is part of a rapid change. A filter is a matrix representing the 8 pixels near a specific pixel. The numbers in the matrix represent multipliers used on the nearby pixels. For instance, a simple edge detection matrix is:

| 1  | −1 | −1 |
|----|----|----|
| −1 | +8 | −1 |
| −1 | −1 | −1 |

This means take the present pixel and multiply its value by +8. Then take all of the others around it, multiply each one by −1, and add to make a new total. If all of the pixels have the same value, it will produce a value of 0. If the value is a large positive, it means that the center pixel was very different from the others. This filter does not care about direction however, and direction is always important.

The following filter is very good at detecting bright to dark transitions when moving from left to right, and can be used to extract score information from an image of the scorecard 200 of FIG. 2.

| +3 | −2 | −1 |
|----|----|----|
| +3 | −2 | −1 |
| 3  | −2 | −1 |

Figure 6:
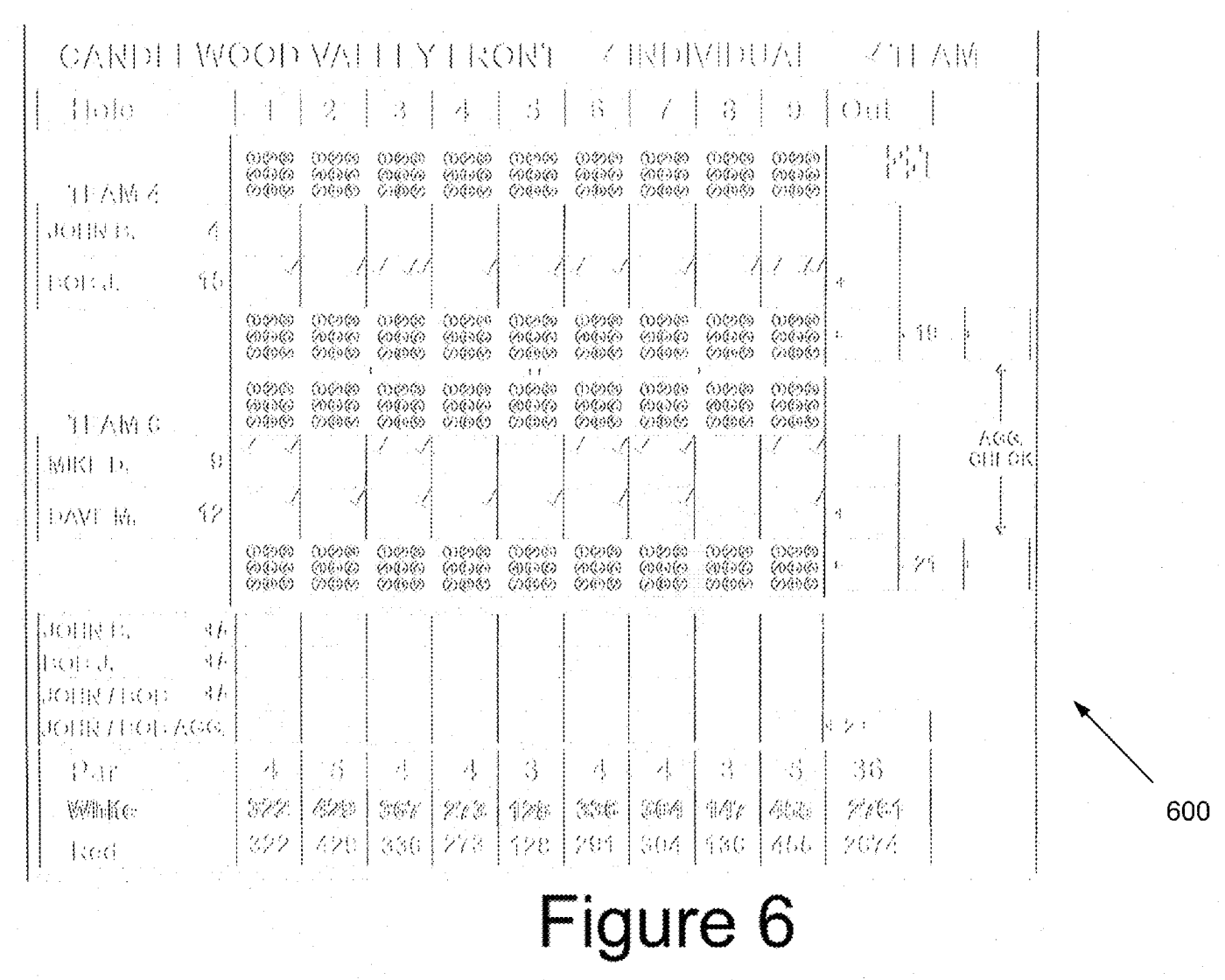

In this case, if moving from left to right, when the bright pixels are on the left, you will get a large number when they are multiplied by +3. The dark pixels have small values and will be multiplied by −2 and −1 and will NOT take away from the high total. This will be seen as a sharp edge but will only occur when changing from bright to dark moving left to right. FIG. 6 illustrates an image 600 of the scorecard 200 filtered in this way. In this example, in order to make it easier for a person to view the image, the image in FIG. 6 has been converted so that the strong sharp edges show up in black. Comparing the image 600 in FIG. 6 to the scorecard 200 in FIG. 2, only vertical edges that are on the left side of a black stripe show up (these are bright to dark moving left to right). The horizontal lines shown in FIG. 2 are not shown in FIG. 6, since they are not picked up at all with this filter.

The filter matrix below illustrates an example of a bright to dark filter for right to left movement.

| −1 | −2 | +3 |
|---|---|---|
| −1 | −2 | +3 |
| −1 | −2 | +3 |

This filter above will only pick up bright to dark edges when moving right to left.

To start at the top and move down looking for bright to dark, an exemplary filter comprises:

| +3 | +3 | +3 |
|---|---|---|
| −2 | −2 | −2 |
| −1 | −1 | −1 |

Figure 7:
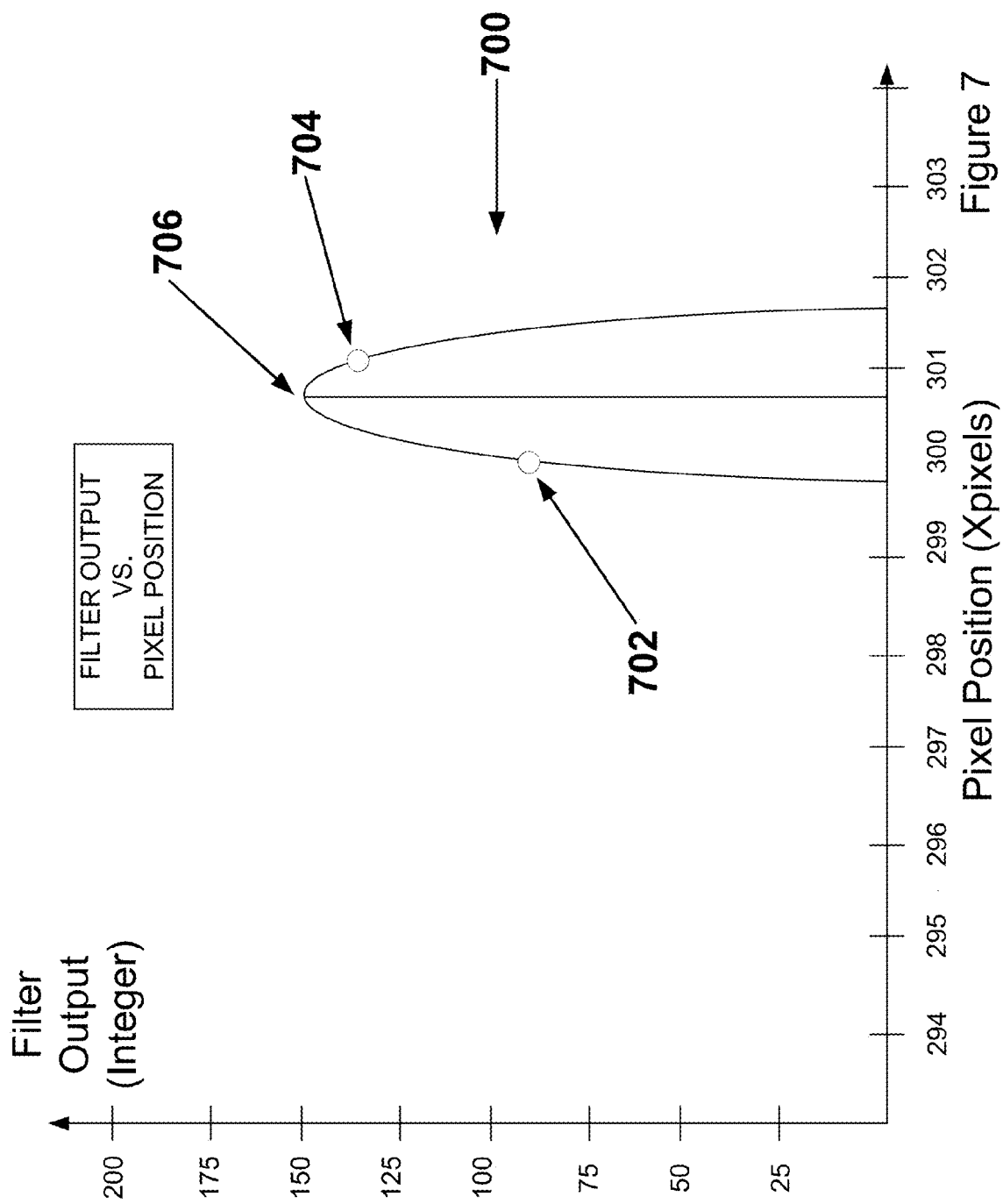
FIG. 7 is a graph illustrating filter output versus pixel position for a scorecard imaging process incorporating aspects of the disclosed embodiments.

Now that the filter detects large changes in the desired direction, finer resolution is required than the raw image. This is true whether a scanner 508 is used or whether a smartphone camera 544 is used. The aspects of the disclosed embodiments improve the detection of the position of the edge, and it does so by looking at the data that makes up the whole line. The rapid edge will show the highest intensity in the search line. The aspects of the disclosed embodiments takes the two data points on either side of the highest intensity point, even if one of the points is very low or zero. This is illustrated in FIG. 7. In this graph of filter output versus pixel position, at reference 702, for a pixel position of about 300, the value of the filter output is about 90. At reference 704, for a pixel position of about 301, the filter output value is about 130. The aspects of the disclosed embodiments determines the higher of the two values, which in this example is a filter output of 130 at point 704, and then takes the values on either side of it. In this example, there is only point 702 to the left with a filter output of 90. The value to the right is 0. By determining a parabola 700 that includes each of these three points 90, 130 and 0, the resulting parabola 700 has a peak 706 that is not at either 300 or 301. The aspects of the disclosed embodiments solve the equations to find where the parabola 700 has 0 slope and this is determined as the maximum. In this case it is about 300.7 where the peak 706 occurs. This is where the edge is considered to be. In practice, this offers a resolution of about $1/10^{th}$ of a full size pixel. With this algorithm, the aspects of the disclosed embodiments can use either a scanner 508 or a smartphone camera 544 to find the positions of reference marks.

Once the reference marks are known, the aspects of the disclosed embodiments then calculate whether the image is at an angle or if it has been stretched or shrunk. It now has an accurate coordinate system. It will make this calculation at many different points in the image. For instance, in FIG. 2 the middle black bar 220 has small white marks or stripes 222 in it. These stripes 222 are used to find the accurate value of the X position in case the image has been degraded through use or even by having the player fold the scorecard 200. These additional marks 222 are used to find the positions of the matrices that hold the data for a given hole for a given player.

In one embodiment, once the first hole for player 1 is located on the image 600 of FIG. 6, the imaging processing of the disclosed embodiments looks to the calculated location of the nine circles 224. The raw intensity of each of the nine circles 224 is measured and a determination of the circle 224 with the lowest intensity is determined. The circle 224 that has been marked or blackened with a pen or pencil will typically have the lowest intensity and this is determined to be the score for that player on that hole. This process is repeated for all players and all holes, and each score is stored. Once all scores are known for all players, the software uses the player's handicaps to determine the stroke adjustment and the winner of each hole, and calculates all of the points to be given to all players. Here the number of holes where each player was a factor will be taken into consideration when distributing the points. In many case, fractions of points will be awarded depending on how team members played relative to one another.

In one embodiment, the system 500 allows a player to enter scores while on the course using a touch screen of the portable communication device 540. In this embodiment, a scorecard will be presented on a display 542 of the device 540, such as the scorecard 300 shown in FIG. 3. For example, when the player logs into the auto scoring server 300, the player can enter identification information regarding the tournament and the particular team. In one embodiment, when the information is verified, the scorecard information, which can include the player, handicap and stroke information, can be automatically downloaded to the device 540 and the information populated in the screen 542 of the device 540 to form for example, the scorecard display 300 shown in FIG. 3. During the match, the player(s) can enter their scores into the appropriate score blocks 310.

In one embodiment, to enter a score, the user can select from one or more numbers that are presented in the score box 210, 310 for a particular hole. For example, in one embodiment, the par value for the hole, or other suitable number, can be presented in the score box 310. In one embodiment, the system includes a score chooser that provides the numbers 3-7. The person entering the scores can then manipulate the keys on the device to select a number of use the up/down or +/− selection keys, to select and indicate the score. The selected score can be "entered" by selecting the "enter" selection key or moving to another score box or selection. In an alternate embodiment, the user can select a number from the keypad of the device 540, which will be entered into the respective score box 310. The aspects of the disclosed embodiments enable the scores for each hole to be entered with a minimum of effort or interaction required by the user.

Thus, by touching 5 buttons quickly, an entire holes worth of data will have been entered. If a larger number is needed, then the plus key can be hit to get to higher numbers. The same is true for the lower numbers, and they can be reached by hitting the minus key. Prior to entering the score chosen on the scorecard, the aspects of the disclosed embodiments can refine the score due to league rules. Many leagues set a maximum for any hole to avoid playing very slowly. Often this is set at a value equal to two times par and this is easily calculated and makes sure that all players play according to this league rule.

In one embodiment, the entry of the score data can be inputted using voice commands. For example, in one embodiment, the user can say "enter four scores." The device 540 can be configured to respond and allow the user to "say" the score, which will then be verified by the device, such as by repeating the score or scores. The score will then be committed to the score box 310.

In one embodiment, once the score data is entered, the status fields on the scorecard 300 will automatically be filled in with the data appropriate to the scores entered. As each hole is played and scores are entered, the status is calculated and more status fields will be filled in. The players will instantly know the status of all parts of their match as it will be displayed for them on the smartphone. In addition to displaying the status of all parts of the match, the total points for each player is calculated along with the status and displayed immediately. This lets all players know exactly how well they are doing, even relative to their own partner.

In one embodiment, the scorecard 300 can be fine-tuned for the person entering the scores. Paper scorecards are usually prepared by putting the person with the lowest handicap of the foursome at the top of the scorecard. Then all status will be relative to the team at the top. Often the scorekeeper is recorded lower on the scorecard but would prefer to be at the top so that all status is relative to that player and his partner. To fine tune the electronic scorecard 300, in one embodiment, the scorekeeper only has to activate the "switch team button" on the display, and the positions of the two players will switch instantly. Immediately, the status will then be relative to the players at the top.

In one embodiment, the entered data is shown on the display 542 of the device 540, as well as automatically uploaded to the auto scoring server 530. For example, as a score is entered, if a communication connection with the auto scoring server 530 is enabled or available, the score data will be uploaded or transmitted. The auto scoring server 530 can store the data as well as transmit the data to the administrator at pre-determined intervals or in real-time. This will allow the administrator, as well as other observers and participants, to follow the matches and scoring in real time. For example, in one embodiment, the individual score cards, or a collective summary of the player's scores, can be provided on a suitable display for all to observe, such as in the clubhouse of the golf course. Furthermore, interested parties will be able to follow the matches online. For example, a non-player can log-in to the auto scoring server 530, and view the tournament results. Information and scores related to individual players and the respective teams will also be able to be selected and monitored, in substantially real-time as the score information is entered and uploaded to the auto scoring server 530. The information that is presented can include the individual hole scores as well as the match and competition summaries. In one embodiment, predictions can be made about holes not yet played, based on the past and current performance of the player. For example, assumptions about how a player will score on a hole not yet played can be made. This assumption information can be used to make predictions as to the outcomes of the various matches and competitions, such as the Skins competition. As scores are entered for these holes, the assumption data is overwritten with the actual data, and new assumptions can be made.

Once the match is complete, and all of the score data for each player and team recorded, in a manner similar to that described above, the aspects of the disclosed embodiments utilize the player handicap information to determine the stroke adjustment and the winner of each hole, and calculates all of the points to be given to all players. Here again, the number of holes where each player was a factor can be taken into consideration when distributing the points. In many cases, fractions of points will be awarded depending on how team members played relative to one another.

When the data for all of the scorecards is entered, the calculations can be made for the competitions such as the Skins. Here all scores will be searched for birdies and eagles and the winners will be shown on a list.

The aspects of the disclosed embodiments enable the auto scoring website or server 530 shown in FIG. 5 to be linked with other useful websites. For example, the auto scoring website 530 can link, or include links to the USGA website and other organizations to get up to date information on player's handicaps just before a tournament starts. Current information on golf courses, such as the course rating from a number of different tees, can be retrieved in real time, and the administrator will only have to select courses from a list instead of entering the data for each one.

The aspects of the disclosed embodiments can also be configured to work with many different tournament formats. For example, the aspects of the disclosed embodiments can be used with one or two day tournaments such as a member-member or member-guest, where players compete by playing all teams in a flight. The aspects of the disclosed embodiments can also be used with tournaments known as "Scrambles" where four players form a team but only one score from the team as a whole is scored and reported. Typically, eighteen holes are played in such tournaments and competitions such as "Skins" are included. The aspects of the disclosed embodiments can also be applied to league type tournaments, where teams generally play once per week for a ten to twenty week season. The aspects of the disclosed embodiments can be applied to four players who are playing a typical once per week match. One player will typically serve as the administrator for the foursome and will setup the match and save it under a specific name with the auto scoring server. The match data can be loaded anytime and a scorecard created and downloaded in a print form or electronically to the portable communication device 540 of the administrator or anyone of the players. While it may be possible to download more than one scorecard for a match, if for example, another player wishes to keep score as well, the aspects of the disclosed embodiments will prevent duplication of scores, or the upload of more than one score for a match. For example, only one of the scorecards, whether electronic or printed, can be uniquely identified as the original or administrator scorecard. Only the scores from the identified scorecard will be allowed or enabled to be uploaded. In case of a conflict, typical read and write provisions and protections can be implemented. For example, the duplicate entry can be refused, or the user can be required to affirmatively accept that the entry is a duplicate and the existing scores are to be modified, updated or replaced. Suitable logs and security protocols can be maintained to provide error checking and verifications.

In a typical match using the scoring system of the disclosed embodiments, the scoring and presentation of results can be substantially immediate, depending upon the availability of a suitable network connection. For those who want to use the mobile communication device 540 to enter scores but not to view them after the match, a resulting scorecard can be printed after the match. For example, the administrator or other authorized player or person can the golf course computer to access the auto scoring website 530. When the administrator logs in, he can see the data that was just calculated from the score information that was sent from his device 540 during the match. He can print a scorecard of the results, which will also have the outcome of any competitions that were entered. This resulting scorecard can now be shown to the rest of the foursome and they can clearly see whether they won or lost money as a result.

The aspects of the disclosed embodiments can be configured and used with typical golf games and there are no restrictions on the information and data that can be entered. As an example, an administrator to enter and save as a format a game with these rules, the terms used herein being understood as typical golf terms that will be comprehended by one of skill in the art:

(1) $3 Nassau, automatic presses when down by 2, automatic press of the back 9, $2 team prize for any birdies, $5 team prize for any eagles, $1 dots for "greenies" and "sandys", $1 individual Skins on the side. For this particular game format, referred to here as parts of the competition, the aspects of the disclosed embodiments can provide another small area on the scorecard 200 that will be added to each teams section to allow them to enter the "dots" or other suitable marks for "greenies" and "sandys" since they are not detectable by their score. Birdies and eagles are calculated automatically.

Another application of the aspects of the disclosed embodiments is the six hole game rotation. In this format, all of the above rules for the "Nassau" are in place, but the teams change every six holes. This way each player has each other player as a partner for six holes. In this application, one additional area is added to the scorecard 200 so the administrator can select which players are partners on which holes. This format can also be selected as a rotating team Skins game as opposed to a team Nassau.

The aspects of the disclosed embodiments can also be used to provide betting slips for paramutual wagering. At tournaments, this type of wagering is a large part of the competition. Players can bet on other teams that may not even be in their flight.

In a paramutual wagering application, the aspects of the disclosed embodiments will print a slip for each player who places a bet. All bets will be recorded and stored in a database and will be readable by, for example, the scanner 508 or camera 544. At the end of the competition, a list is generated of all winning tickets and the players can collect their money. This process is now very accurate and extremely easy on the tournament administrator.

Figure 8:
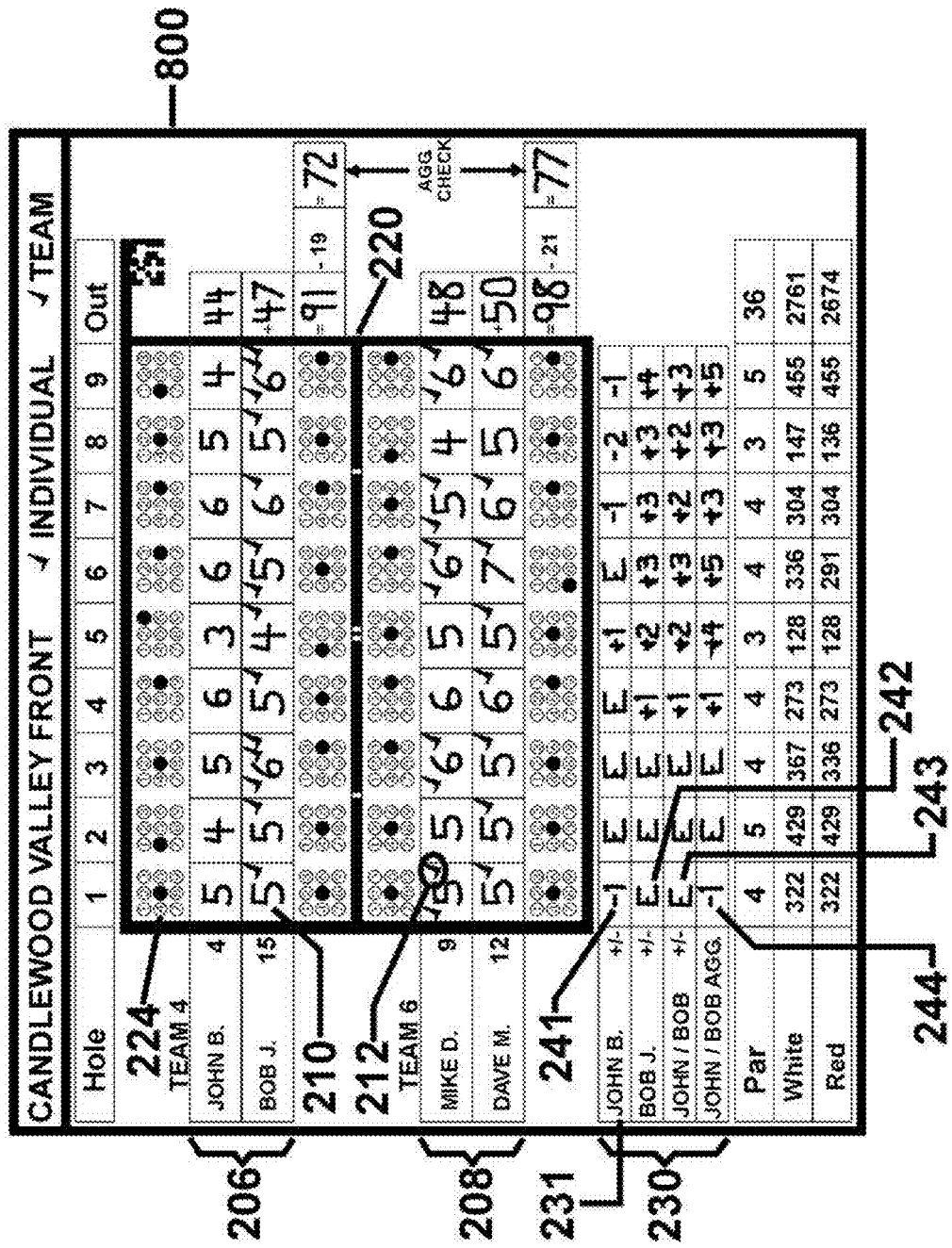
FIG. 8 illustrates an example of a completed printed scorecard incorporating aspects of the disclosed embodiments.

Referring to FIGS. 2 and 8, one example of how the aspects of the disclosed embodiments allow a player to track their progress during a golf match is illustrated. A In this particular example, a blank scorecard 200, such as that shown in FIG. 2 is created by the administrator and downloaded by the player identified as "John B". The designation of "John B." is for illustration purposes only. As play progresses, the scores are entered on the scorecard 200 resulting in the completed scorecard 300 shown in FIG. 3. On hole number 1, all four players scored a "5." The scorekeeper enters a "5" in each block 210 under hole 1.

The area 230 under the scoring area 208 is for recording the results of the individual matches between players. The results in area 230 can be inputted manually or the results will be automatically calculated when the scorecard 200 is scanned and process. The aspects of the disclosed embodiments provide for automatically calculating the results that would appear in area 230 when the scorecard 200 is processed.

The line 231 with the name "JOHN B." is for the individual match of JOHN against MIKE. In this example, as indicated by the mark 212 in block 210 under hole number 1 for MIKE D., a single checkmark is shown, indicating that MIKE receives one stroke from JOHN on this hole number one. Since JOHN scored a "5" and MIKE scored a "5", MIKE is the winner as his net result is a "4". Since MIKE is the winner a "−1" is written in the first block 241. BOB and DAVE each got a "5" and are even, and the square 242 is marked with an 'E'. For the team match of JOHN/BOB versus MIKE/DAVE, the match is even, and the box 243 is marked with an "E." For the aggregate, both teams scored a total of 10 but John/Bob had one 'T' and therefore had a net 9. Mike/Dave also shot 10 but had two 'T's and thus had a net 8, which is better. Therefore John/Bob are −1 in the aggregate, which is marked in box 244. The remainder of the boxes in each row are filled in as each hole is completed.

Figure 9:
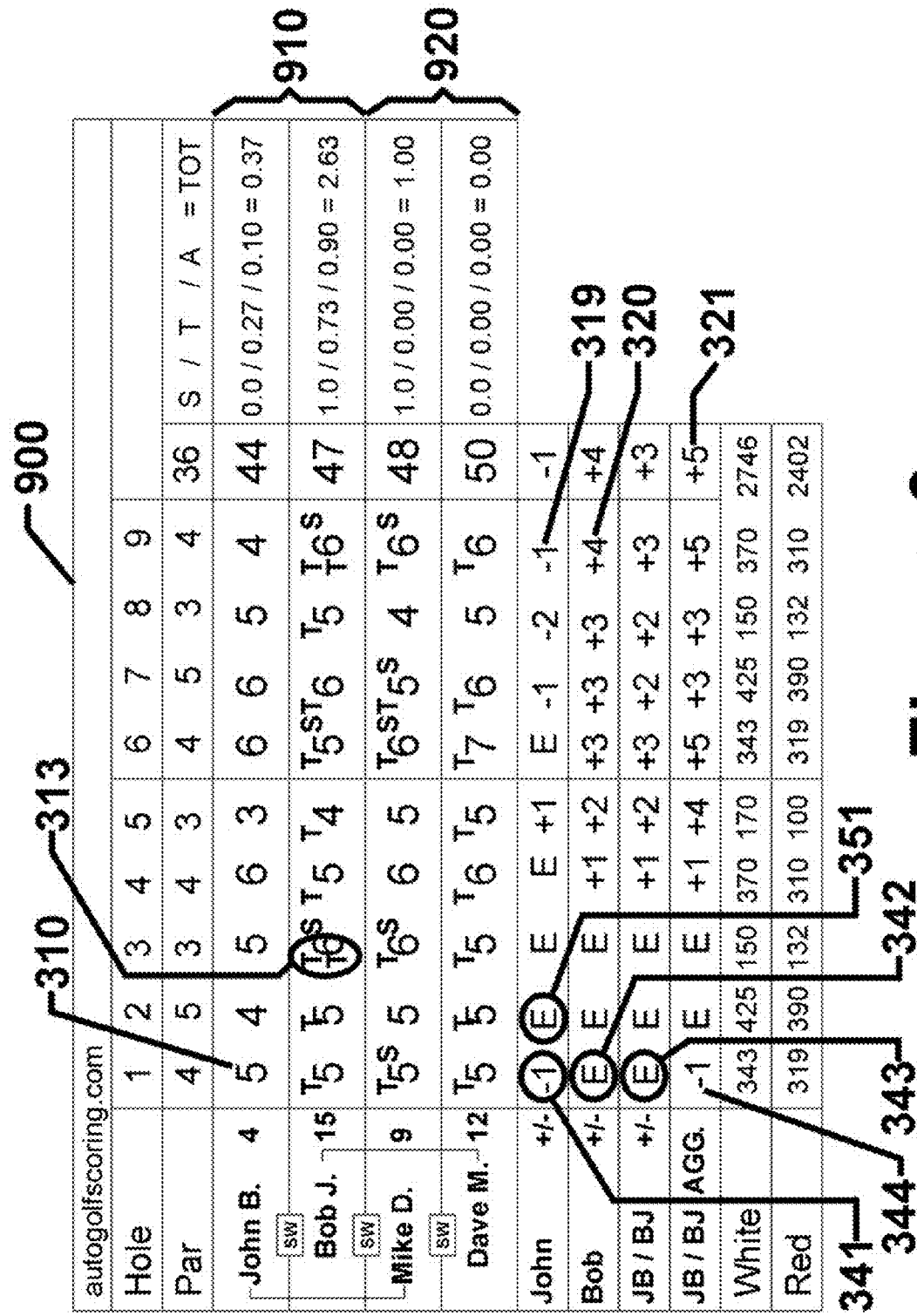
FIG. 9 illustrates an example of a completed electronic scorecard incorporating aspects of the disclosed embodiments.

FIG. 9 illustrates one embodiment of the use of the electronic scorecard 900 as it would appear on the display of a mobile communication device. As is shown in FIG. 3, the downloaded scorecard 300 includes blocks 310 for entering score data, and mark or symbol "S" for indicating the number of strokes received for individual play and the mark or symbol "T" indicating the number of strokes received for team play. The aspects of the disclosed embodiments allow for only the gross hole score data to be inputted and all other fields of the scorecard representing the parts of the game and match will be automatically calculated and completed. This advantageously allows all players, as well as anyone else with access to the system, to know how they and other players are doing in real time relative to their partners, as well as other players in the tournament.

In the example of FIG. 9, for hole number 1, each player scored a "5." The "S" in the block 310 for hole number 1 in the row for MIKE D indicates that MIKE gets a stroke from JOHN. Since JOHN scored a "5" and MIKE scored a "5" for a "4," MIKE wins the hole and a "−1" is automatically entered in the block 341 (circled for emphasis purposes) under hole number one for the row corresponding to JOHN since he is now down by one. BOB and DAVE each scored a "5" and are even, and box 342 is marked with an "E". For the team match the "T" indicates the team strokes, and the best score for both teams was a "4" (i.e. "5 for 4") and an "E" is marked in box 343. For the aggregate score, both teams scored a total of 10 but the team of John/Bob had one "T" and therefore had a net score of "9." The team of Mike/Dave also shot a score of "10", but also received two "T"s, and thus had a net score of "8", which is better. Therefore, the aggregate score entered for the team of John/Bob" in box 344 is "−1." As each hole is played, the scores are similarly entered.

On the hole number 2, JOHN scores a "4" and MIKE a "5", so that match is now even. Box 351 is marked with an "E." BOB and DAVE both scored a "5" so their match remains even. For the team match, either JOHN's 4 or BOB's 5 for 4 is equal to DAVE's 5 for 4 and so the team match is still even. For the aggregate, JOHN/BOB's net 8 is one less than MIKE/DAVE's net 9, and so JOHN/BOB are marked as "E", and the aggregate match is even.

On the third hole, JOHN's "5" ties MIKE's "6 for 5" and so they are still even. BOB's "6 for 5" ties DAVE's "5" and so they are still even. For the team match, BOB has two blue "T"s, as shown by indicators 313, and thus gets two strokes here. BOB's resulting "6 for 4" ties DAVE's "5 for 4" and the teams are still even. For the aggregate score, both teams score a net "9" and so there is no change and it still is marked as "E."

On the fourth hole, JOHN's "6" ties MIKE's "6" and so they are still even. BOB's "5" beats DAVE's "6" and so BOB is now up by one and the corresponding box under hole four is marked "+1." For the team match, BOB's "5 for 4" beats DAVE's "6 for 5" and the team match goes to "+1" for "JOHN/BOB." For the aggregate, JOHN/BOB's net "10" is one less than MIKE/DAVE's net "11", and so JOHN/BOB are now "+1.

This scoring continues all the way to the 9$^{th}$ hole, where JOHN ends up losing by 1 (−1 in box 319) to MIKE. BOB wins by 4 (+4 in box 320) over DAVE. BOB's effort helped his team win by 3, and also helped keep their aggregate score net 5 (+5 in box 321) better than MIKE/DAVE. The system of the disclosed embodiments will automatically calculate all outcomes of all 4 points of the match in this example of four point league play.

In most leagues the four points would be awarded as follows:

BOB—1 pt individual match

BOB—1 pt team match (he would be given the point since he won more holes than his partner DAVE)

JOHN—1 pt team aggregate (he would be given the point since his score was better than his partner MIKE)

TEAM 4—3 pts total

MIKE—1 pt individual match

TEAM 6—1 pt total

The aspects of the disclosed embodiments provides for far better resolution for distributing points. For instance, in the team match, BOB was a factor in 8 holes while JOHN was a factor in only 3. If you consider that there were a total of 11 factor holes, then BOB should get 8/11 ths of the team point, while JOHN should get 3/11 ths of the team point.

For the aggregate, JOHN's score was better than BOB's, but it was 4 strokes higher than his handicap indicates. BOB shot 4 strokes less than his handicap indicates. Said another way, John shot 44 as a 4 handicap. He therefore shot net 40. Bob shot 47 as a 15 handicap, resulting in a net score of 32. This is 8 shots better than John. Therefore, Bob should get 0.8 points more than John. This gives John 0.1 and gives Bob 0.9 and this is far more equitable since Bob actually was a more significant factor.

The totals will now be like this:

BOB—1 pt for the individual match.

BOB—0.73 pt team match (8/11 ths of a point.)

JOHN—0.27 pt team match (3/11 ths of a point.)

BOB—0.90 pt team aggregate.

JOHN—0.10 pt team aggregate.

TEAM 4 (BOB/JOHN)—3 pts total.

MIKE—1 pt individual match.

TEAM 6 (MIKE/DAVE)—1 pt total.

The results are displayed in the team score sections: 910 for Team 4 and 920 for Team 6.

Even though team 4 still gets 3 points, BOB gets a total of 2.63 points and JOHN gets 0.37 points as is shown in section 910 of the score display 900. This is a far more equitable distribution of points based on how these two teammates played relative to their normal games. By the end of a full season, the aspects of the disclosed embodiments will have done a far better job of determining which players were the best during the season than conventional systems. This points distribution will also work in any team match and will do a very good job of quantitatively determining which teammate made the bigger difference in winning.

Referring to FIGS. 10-18, one embodiment of a process incorporating aspects of the present disclosure will be described. FIG. 10 is screen shot 1002 of an exemplary webpage illustrating an initial setup screen for setting up and storing a database for running a golf league using the system 500. In this embodiment, the setup information is entered into the system using the data fields shown in FIG. 10. The information can be stored in the database of the server 502 shown in FIG. 5. Each of the screens provides for forward and back navigation between screens. Screen 1102 shown in FIG. 11 illustrates a completed League Settings data page. In this example, the league has fifteen events that start on May 25, 2012 and executes weekly. There are six teams of four players each. The highest possible score for each hole is equal to twice the par value for the hole. Playing partners will rotate each week so that team players get to play with each one of the other team members. In one embodiment, the scorecard 200, 300 for each week will be automatically updated to reflect the changing playing partners. For handicap calculations, a player will have a handicap that is equal to approximately 80% of how far over par they average. The handicap calculations for each player can be automatically calculated by the system 500.

FIG. 12 illustrates a screen shot of an exemplary web page 1202 that is presented after the league setup page 1002 is complete. In this example, the page 1202 can provide the league schedule. As shown in FIG. 12, the system 500 automatically calculates each of the weeks needed to accommodate the 15 events that have been scheduled. In one embodiment, a selection button 1204 can be provided that will automatically link to information pertaining to one or more golf courses. When a course is selected, all of the pertinent information for the selected golf course can be downloaded to the system 500 and server 502. Screen area 1206 shows that in this example four different golf courses have been selected.

The screen shot of the exemplary web page 1302 illustrated in FIG. 13, shows how the page 1202 will look after the golf courses have been selected for the respective weeks. The selection process can include clicking on a date and then clicking on a desired golf course. The association will be made and shown on the screen 1202. The playing team and partner assignments will also be displayed. In this example, it is shown that for May 25, 2012, the respective player pairings are AB and CD. The player designation of A-D is generally representative of player A having the lowest handicap and player D having the highest handicap in the group. In some league formats, it is preferable to have the lower handicap players, such as A and B, be paired together. The system 500 can automatically assign player partners by handicap in this manner. In one embodiment, the system 500 can also allow the automatic assignment to be overridden, and a manual player pairing made. For example, the AB-CD player pairing can be clicked on, which will enable the pairing to be modified. As is illustrated in the example of FIG. 13, the playing weeks do not all have to be consecutive. As shown here, the week of Jul. 6, 2012 is designated an "Inactive Week." Another date, Sep. 14, 2012, has been added to accommodate the Inactive week.

Once the schedule is set, all dates chosen, golf courses selected and playing pairings established, a final screen 1402 can include the entire schedule. While the screen does not have to be modified for the playing season, the aspects of the disclosed embodiments do allow for modifications to be made. The user can click on the aspect of the schedule that needs to be modified, such as a date, golf course or player pairing, and make the desired changes. If, for example, a scheduled date is re-categorized as inactive, another date can be automatically added to the schedule as is noted above.

The screen shot of the webpage 1502 shown in FIG. 15 illustrates the schedule for each of the six teams in the league. Each of the six teams is identified as one of T1-T6, in the top row 1504. The opponent for a particular week is identified in the row 1506 corresponding to that particular week. If needed, aspects of the schedule can be manually changed by clicking on the portion needed to be changed, and manually altering the content. In one embodiment, a selection of the entry of a particular week, such as for example a right click, can bring up the actual scorecard for the teams that are playing. If the match has not taken place yet, in one embodiment, a blank scorecard will be displayed. For past matches, the final scorecard will be displayed. For an ongoing match, the scorecard in realtime will be presented, and updated periodically as the players enter their scores. In the case of the electronic scorecard 300, the entries and updates will be relatively in realtime, generally dependent upon communication and network availability.

FIG. 16 illustrates a screenshot for a webpage 1602 including the player information. As shown in FIG. 16, the page 1602 includes data fields for information such as email addresses and handicaps. In one embodiment, the information can be read into the system 500 through a comma separated values (CSV) file. In alternate embodiments, any suitable data file can be used. This allows the information to be extracted and stored without the need for manual entry. Email addresses, phone numbers and names can be recognized as unique fields. Handicap values that are higher than the number of teams can also be detected. The information table 1604 shown in FIG. 16 can be scrolled and sorted to view the data in different ways, in manners that are generally understood with respect to data tables.

FIG. 17 illustrates a screen shot of a web page 1702 that provides up to date results for each player in the league. In this embodiment, the chart 1704 identifies each of the players, their handicaps, team numbers and their total points. The aspects of the disclosed embodiments allow this information to be uploaded from a player's smartphone automatically during a match to keep the results up to date. The data can be viewed by anyone with access to the website, although editing privileges can be restricted.

FIG. 18 illustrates a screen shot of an exemplary webpage 1802 that shows a point total for each team in the league. The chart 1804 will be updated automatically as scores are entered. In this manner, the chart 1804 on the webpage 1802 is configured to provide real time results as the matches are going on.

The aspects of the disclosed embodiments allow an administrator, such as a tournament director, to setup a golf league of match. This includes player information, including handicaps and player pairings, substitutes, golf course information and schedules. Updates can be easily made and propagated throughout the system. The aspects of the disclosed embodiments also include developing a scorecard that enables ease of recording scores, as well as tabulating scores during and after a match. An electronic scorecard can be downloaded to a player's mobile communication device, such a smartphone or tablet type device. The electronic scorecard will look and provide essentially the same format of the typical golf scorecard that most player's are accustomed to. During the game, the player's can enter their scores in real time into their device. This can include entering scores using voice commands. The scores can be automatically transmitted or uploaded to a server, where the match results are calculated and tabulated. The results can include not only the game play, but also side games and "bets" that are commonly associated with the game of golf. Individual results and team results are automatically uploaded and determined by the system, and can be displayed in real time. The updated and current results can be displayed on the player's device as well as on other devices. Players and others can monitor the match results in real time by accessing the website.

The disclosed embodiments may also include software and computer programs incorporating the process steps and instructions described above. In one embodiment, the programs incorporating the process described herein can be stored as part of a computer program product and executed in one or more computers in one or more of the devices or systems shown in FIG. 5. The computers can each include computer readable program code means stored on a computer readable storage medium for carrying out and executing the process steps described herein. In one embodiment, the computer readable program code is stored in a memory.

The devices and systems shown in FIG. 5 can be linked together in any conventional manner, including, a modem, wireless connection, hard wire connection, fiber optic or other suitable data link. Information can be made available to each of the systems and devices using a communication protocol typically sent over a communication channel or other suitable communication line or link.

The systems and devices shown in the embodiments disclosed herein are configured to utilize program storage devices embodying machine-readable program source code that is adapted to cause the devices to perform the method steps and processes disclosed herein. The program storage devices incorporating aspects of the disclosed embodiments may be devised, made and used as a component of a machine utilizing optics, magnetic properties and/or electronics to perform the procedures and methods disclosed herein. In alternate embodiments, the program storage devices may include magnetic media, such as a diskette, disk, memory stick or computer hard drive, which is readable and executable by a computer. In other alternate embodiments, the program storage devices could include optical disks, read-only-memory ("ROM") floppy disks and semiconductor materials and chips.

The systems and devices may also include one or more processors or processor devices for executing stored programs, and may include a data storage or memory device on its program storage device for the storage of information and data. The computer program or software incorporating the processes and method steps incorporating aspects of the disclosed embodiments may be stored in one or more computer systems or on an otherwise conventional program storage device.

In one embodiment, one or more of the devices and systems, such as the computers 502, 512 and mobile communication device 540 can include a user interface and/or a display interface 506, 542 from which aspects of the present disclosure can be accessed, viewed and controlled. The display interface 542, which in one embodiment can an integrated user interface, is generally configured to allow the input of queries and commands, as well as present the results of such command and queries.

The aspects of the disclosed embodiments manage a database of players and teams, and creates highly customized scorecards for matches competitions such as golf. The scorecards offer a great deal of visual information for the players to be able to track the match as it is being played. The scorecards can be in the form of a printed scorecard or an electronic scorecard that is downloaded to a personal communication device. In the form of a printed scorecard, distinctive marks indicate handicap information and scores are marked on the scorecard in a manner that is suitable for scanning. Each scorecard can be scanned to extract the score data. In the case of an electronic scorecard, the data is entered directly into the mobile communication device, from where it is automatically uploaded to the auto scoring server, and the scoring and competition results tabulated in real time. After the match, the aspects of the disclosed embodiments allows the direct reading of all of the data relating to how the individual competitors performed. Smartphone type devices can be used to display the scorecards and accept the data input for each player. The device immediately displays the status of all parts of a match. The data can be constantly uploaded to a website or other service, so it can be collected from all matches. This way, the status of all matches is updated in real time. The total status of a specific league can be seen in real time as well. This can be viewed on a computer with a large monitor and can be used at tournaments to display to many people the current status.

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system for automated real-time scoring of a golf match for a group of players comprising:
   a controller with a memory in communication with a processor, the memory including program instructions for execution by the processor to:
   load player data including handicap information into a server;
   load course data into the server;
   identify team members;
   automatically assign team pairing based on handicap information of each team member;
   generate a an electronic scorecard for the golf match, the electronic scorecard including the handicap information and team pairing information;
   download the electronic scorecard to a user device;
   detect a score for each player as entered on the electronic scorecard on the user device in real time during the golf match;
   automatically update match results on the electronic scorecard and the server based on the detected score; and
   provide the updated match results in real time during the golf match.

2. The system of claim 1, the memory including program instructions for execution by the processor to:
   rearrange player pairings for different matches based on the handicap information for each player on a team.

3. The system of claim 1, the memory including program instructions for execution by the processor to:
   substitute a new player for an existing player by uploading information for the new player onto a respective team;
   update handicap information for the new player; and
   automatically generate a new electronic scorecard with the updated player information.

4. The system of claim 1, the memory including program instructions for execution by the processor to:
   calculate an apparent handicap for a player without handicap information by:
   comparing a score of the player without handicap information on a hole to a par value for the hole; and
   generate the apparent handicap based on the score, par value and a number of holes played.

5. The system of claim 1, the memory including program instructions for execution by the processor to:
   detect a score inputted into the scorecard for a player in the group;
   adjust the inputted score in real time on a basis of handicap of each player; and
   determine a team score on the basis of the adjusted score.

6. The system of claim 1, comprising a server computer for storing player information and scorecard information, the server computer being configured to calculate results of the golf match based on inputted scores and present the results for display in realtime.

7. The system of claim 1, comprising a voice activated scoring device, wherein the memory includes program instructions for execution by the processor to:
   detect a request to input a score for a player;
   provide a voice prompt to request entry of the score in the device;
   detect entry of the score in the device; and
   verify the entry of the score.

8. A computer program product for, the computer program product comprising:
   computer readable code means, the computer readable program code means when executed in a processor device, being configured to:
   detect an identifier of a player for a golf match;
   retrieve golf handicap information for the player;
   store the player identifier and golf handicap information;
   assign players to a team, each player having an identifier and golf handicap;
   create player pairings for each team based on a handicap of each player; and
   generate an electronic scorecard for the golf match, the electronic scorecard identifying the player, teams and golf handicap information;
   download the electronic scorecard to a user device;
   detect a score for each player as entered on the electronic scorecard on the mobile device in real time during the golf match;
   automatically update golf match results on the electronic scorecard and the server based on the detected score; and
   provide the updated golf match results in real time during the golf match.

9. The computer program product of claim 8, wherein the computer program code means when executed in the processor device is further configured to:
   detect an input of a score for a player on the electronic scorecard during the golf match;
   record the score for a particular hole; and
   update match results based on the recorded score.

10. The computer program product of claim 3, wherein the computer program code means when executed in the processor device is further configured to:
    present updated golf match results during the match on a display of a user device.

11. The computer program product of claim 9, wherein the computer program code means when executed in the processor device is further configured to:
    calculate a result of all parts of the match based on the inputted score; and
    present the result of all parts of the match on a display of a user device.

12. The computer program product of claim 9, wherein the computer program code means when executed in the processor device is further configured to:
    detect a request to change a player entry on a scorecard;
    substitute an identifier an existing player identifier with an identifier for a new player;

update the scorecard with handicap information for the new player; and reproduce the scorecard with updated player information.

13. The computer program product of claim 9, wherein the computer program code means when executed in the processor device is further configured to:

detect a request to change player pairings on a scorecard; and automatically reconfigure player pairings on the scorecard based on handicap information and information in a data field indicating whether one player has played another player.

14. The computer program product of claim 9, wherein the computer program code means when executed in the processor device is further configured to:

detect a request to register a score for a player;

provide a voice prompt to request registration of the score in the device;

detect a voice command corresponding to the score;

register the score in the device; and verify the entry of the score.

15. The computer program product of claim 9, wherein the computer program code means when executed in the processor device is further configured to:

detect registration of a score for a player on a hole;

calculate a result of the match based on the detected registration; and update results for all parts of the match.

16. The computer program product of claim 15, wherein the computer program code means when executed in the processor device is further configured to:

present the match results and updated results on a display of a user device during the of match.

17. The computer program product of claim 15, wherein the computer program code means when executed in the processor device is further configured to:

compare the registered score on the hole to all competition parts of the golf match; and identify results of each competition part as the golf match is ongoing.

18. The computer program product of claim 15, wherein the computer program code means when executed in the processor device is further configured to:

generate an electronic scorecard for presentation on a display of a mobile communication scorecard;

enable a registration of a score on the electronic scorecard during the golf match; and present all match results on the electronic scorecard in real time during the golf match as a score is registered on the electronic scorecard.

\* \* \* \* \*